No. 664,159. Patented Dec. 18, 1900.
C. KITCHIN.
AUTOMATIC VEHICLE HITCH BRAKE.
(Application filed May 31, 1900.)
(No Model.)
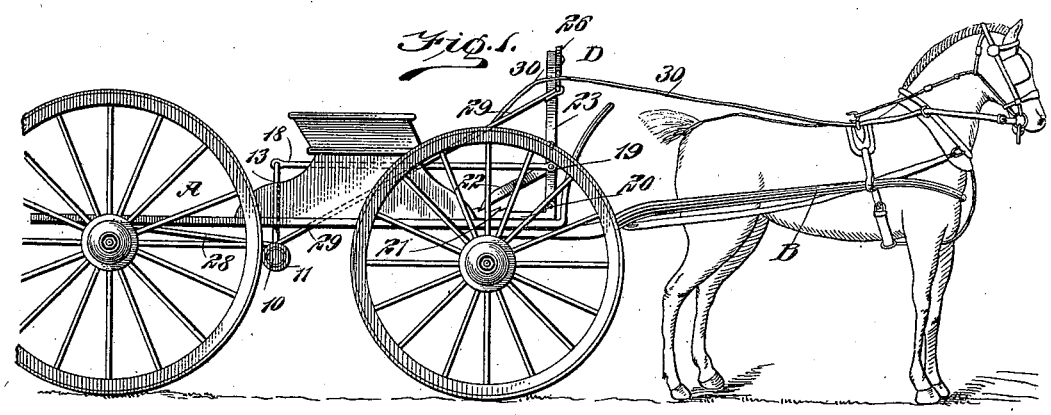
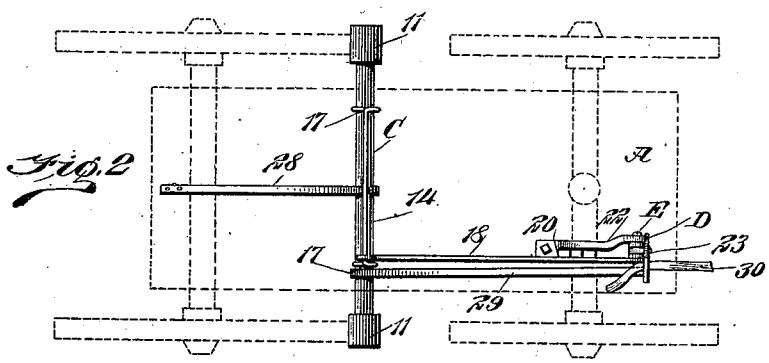
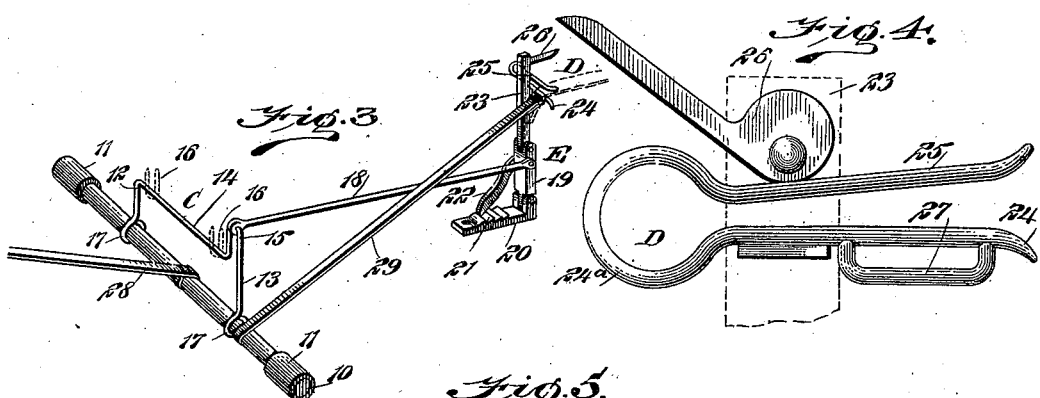
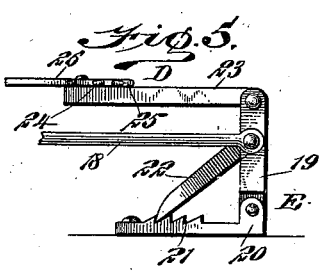
WITNESSES:
INVENTOR
Charles Kitchin.
BY
ATTORNEYS

UNITED STATES PATENT OFFICE.

CHARLES KITCHIN, OF ELWOOD, INDIANA.

AUTOMATIC VEHICLE HITCH-BRAKE.

SPECIFICATION forming part of Letters Patent No. 664,159, dated December 18, 1900.

Application filed May 31, 1900. Serial No. 18,539. (No model.)

*To all whom it may concern:*

Be it known that I, CHARLES KITCHIN, a citizen of the United States, and a resident of Elwood, in the county of Madison and State of Indiana, have invented a new and Improved Automatic Vehicle Hitch-Brake, of which the following is a full, clear, and exact description.

The purpose of the invention is to provide an attachment to vehicle-brakes so constructed that when the brake is fully or partially applied at the time a vehicle is to be left standing the driving-reins may be attached to the brake-lever or a separate construction and the brake-beam be controlled automatically to such an extent that while the animal is free to move backward and forward a limited distance in the shafts an undue forward or undue backward movement will result in the application of the brake-shoe or rollers to the wheels of the vehicle in a more positive manner, thus insuring that the horse and vehicle will remain where they are left standing and also providing for a proper disposition of the reins during such time.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vehicle having the improvement applied, one of the wheels being broken away to disclose the brake-lever. Fig. 2 is a plan view of the members of the improvement, the axle, wheels, and body of the vehicle being shown in dotted lines. Fig. 3 is a perspective view of the brake and the attachments thereto. Fig. 4 is an enlarged detail plan view of the clip adapted to hold the reins, which clip is carried by the brake-lever or a separate construction; and Fig. 5 is a view, on a smaller scale, illustrating in side elevation the brake-lever, the locking device therefor, the connecting-bar attached to the brake-lever, and the device employed for holding the reins.

A represents a vehicle to which the improvement is applied, and B the shafts thereof. The brake-beam 10 of the vehicle is suspended, as usual, between the front and the rear wheels, except when attached to the vehicle-gear and applied to the hub of the wheel, and is provided with friction-rollers 11 at its ends, constructed in any suitable or approved manner. The brake-beam 10 is shown suspended and to be manually operated by a hanger C, comprising side members 12 and 13, a top member 14, a crank-arm 15, formed in the upper member 14, and eyes 17, in which the brake shaft or beam 10 is free to turn. The upper member 14 is removably attached to the body of the vehicle by staples 16 or equivalent devices.

One end of a connecting-rod 18 is pivotally attached to the crank-arm 15 of the main hanger C, and the other end of this connecting-rod is pivotally attached to a member 19 of a brake-lever E, which member 19 is pivoted at its bottom to a rack 20 and may be provided with suitable teeth 21, inclining in a rearward direction. The main section 23 of the brake-lever is usually pivotally connected with the upper end of the section 19, or the parts 23 and 19 may be one and the same, and when the brake is applied through the medium of the said lever E the upper member 23 is in a vertical position, extending upward, as is likewise the member 19, as shown in Figs. 1, 2, and 3, and the member 19 of the lever may be held in this position by a pawl 22, pivoted to the member 19 and engaging with the teeth 21 of the rack 20 or other device.

The upper or main member 23 of the brake-lever E carries a rein-clip D, if not of separate construction. This rein-clip is constructed of a spring material bent upon itself to form, preferably, a bow member and opposing leg members 24 and 25, the bow member being designated as 24ª. This rein-clip is attached by one of its leg members—the member 24, for example—to the upper or front surface of the main member 23 of the brake-lever or separate construction and extends beyond both sides of the said member 23 of the brake-lever, as is best shown in Fig. 4.

A cam-lever 26, which is fulcrumed upon the upper member 23 of the brake-lever E, engages with the free leg 25 of the rein-clip and is adapted to force the said free leg 25 in direction of the fixed leg 24, and thus securely clamp the reins or lines between the said members. The fixed member 24 of the rein-clip is provided with a projection 27 of staple form, as is also shown in Fig. 4. The attachment to a brake supported and operated as described or to a similar brake consists in a strap, chain, or the like 28, which is secured to the brake bar or beam 10, the forward end of the strap 28 being at the rear portion of the said brake beam or bar, and the other end of this strap 28 is attached to the rear portion of the body or running-gear of the vehicle. A second strap 29, chain, or the like is likewise attached to the brake bar or beam 10; but the attachment is made in an opposite direction to the attachment of the rear strap 28, and this second strap 29 is carried forward and is secured at its forward end to the staple 27 of the rein-clip D, as is best shown in Fig. 3.

When the brake is on, the member 23 of the lever E or other construction for carrying the rein-clip D is in a vertical position, and when a person leaves the vehicle the reins are passed between the members of the clip D and are held in place by the action of the cam-lever 26. The reins are purposely left somewhat slack, and should the horse attempt to draw the vehicle forward the strap 29, attached to the clip and brake-beam, will be wound upon the latter, and the clip and member 23 of the brake-lever or other construction for carrying the rein-clip D will be drawn rearward, and the slack of the reins will be taken up and the animal will be checked, the brake remaining on. When the animal steps back, the strap 29 is unwound and the strap 28 is wound upon the brake-beam, thus preserving the rollers in position against the wheels of the vehicle or the hub of the wheels, if attached to the running-gear, but permitting the animal to have sufficient freedom for comfort.

Having thus described my invention, I claim as new and desire to secure by Letters Patent—

1. A brake bar or beam for vehicles, a support therefor, and a lever in operative connection with the brake bar or beam, a strap or chain attached to the brake beam or bar and to the rear portion of the support therefor, a second strap attached to the brake beam or bar in an opposite direction, and a rein-holder to which the second strap is attached.

2. In vehicles, a body, a brake beam or bar having brake-shoes or rollers, a shifting device for the brake beam or bar, in which device the beam or bar is free to turn, a lever connected with the shifting device, a strap or chain attached to the brake-bar, and wound thereon in a rearward direction and secured to the rear portion of the vehicle body or gear, and a second strap attached to the brake bar or beam, and wound thereon in a forward direction, and a movable rein-holder to which the latter strap is attached.

3. In vehicles, the combination, with the body, a brake beam or bar provided with shoes or rollers, a shifting device connected with the body, and in which the said brake beam or bar is free to turn, a brake-lever connected with the shifting device, and a rein-clamp carried by said lever, of a strap or chain attached to the brake bar or beam and wound thereon in a rearward direction, the said strap or chain having attachment to the rear portion of the body or gear of the vehicle, and a second strap or chain likewise attached to the brake beam or bar, and wound thereon in a forward direction, the said strap or chain being attached to the rein-clamp, for the purpose set forth.

4. In brakes for vehicles, a brake beam or bar mounted to revolve, supports and shifting devices for the brake beam or bar, and a lever connected with the shifting devices, having a pivoted member capable of a horizontal rearward projection, a rein-clamp secured to the pivoted member of the lever, which rein-clamp is of fork-like construction, having one leg free and the other attached, a cam-lever arranged for engagement with the free end of the clamp, a strap or chain attached to the brake-beam and wound thereon in a rearward direction and adapted for attachment also to a rear support, and a second strap or chain attached to the brake beam or bar and wound thereon in a forward direction, and means for attaching the latter strap to the fixed member of the rein-clamp, for the purpose specified.

In testimony whereof I have signed my name to this specification in the presence of two subscribing witnesses.

CHARLES KITCHIN.

Witnesses:
NELSON WILLIAMS,
HARRY M. BROWN.